(12) United States Patent
Kakii et al.

(10) Patent No.: US 6,950,119 B2
(45) Date of Patent: Sep. 27, 2005

(54) VIDEOCONFERENCE SYSTEM, TERMINAL EQUIPMENT INCLUDED THEREIN AND DATA DELIVERY METHOD

(75) Inventors: Toshiaki Kakii, Yokohama (JP); Yoichi Hata, Yokohama (JP); Hisao Maki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 235 days.

(21) Appl. No.: 10/413,588

(22) Filed: Apr. 15, 2003

(65) Prior Publication Data

US 2004/0114032 A1 Jun. 17, 2004

(30) Foreign Application Priority Data

Apr. 15, 2002 (JP) .................................... P2002-112579

(51) Int. Cl.[7] ................................................. H04N 7/14
(52) U.S. Cl. ............................. 348/14.08; 348/14.01; 348/14.09; 348/14.16; 709/204
(58) Field of Search .......................... 348/14.01–14.16; 709/204

(56) References Cited

U.S. PATENT DOCUMENTS

| | | | |
|---|---|---|---|
| 4,736,407 A | * | 4/1988 | Dumas .................... 348/14.08 |
| 6,005,604 A | | 12/1999 | Kakii |
| 6,137,526 A | | 10/2000 | Kakii |
| 6,181,784 B1 | * | 1/2001 | Duran et al. ............. 348/14.06 |
| 2004/0003040 A1 | * | 1/2004 | Beavers et al. ............ 709/204 |

OTHER PUBLICATIONS

Rikio Sato et al., 1967 Joint Meeting of Four Electric Institutes (No. 1998). p. 2316.

* cited by examiner

*Primary Examiner*—Wing Chan
(74) *Attorney, Agent, or Firm*—McDermott Will & Emery LLP

(57) ABSTRACT

The invention relates to a videoconference system and others of structure enabling smooth progress of interlocution even in distance interlocution among many people through a plurality of terminal devices. The videoconference system is a network system enabling transmission and reception of data by several types of media through a plurality of terminal devices connected by a transmission means, and is provided with a management table for managing users of the respective terminal devices in a state in which the users are sorted in an interlocutor mode for interlocutors mainly engaged in progress of a specific subject and in an observer mode for observers other than the interlocutors, and a communication control means for editing interlocution information by media selected from interlocution information among users sorted in the interlocutor mode and delivering the edited information to the terminal devices of the respective users sorted in the observer mode.

18 Claims, 10 Drawing Sheets

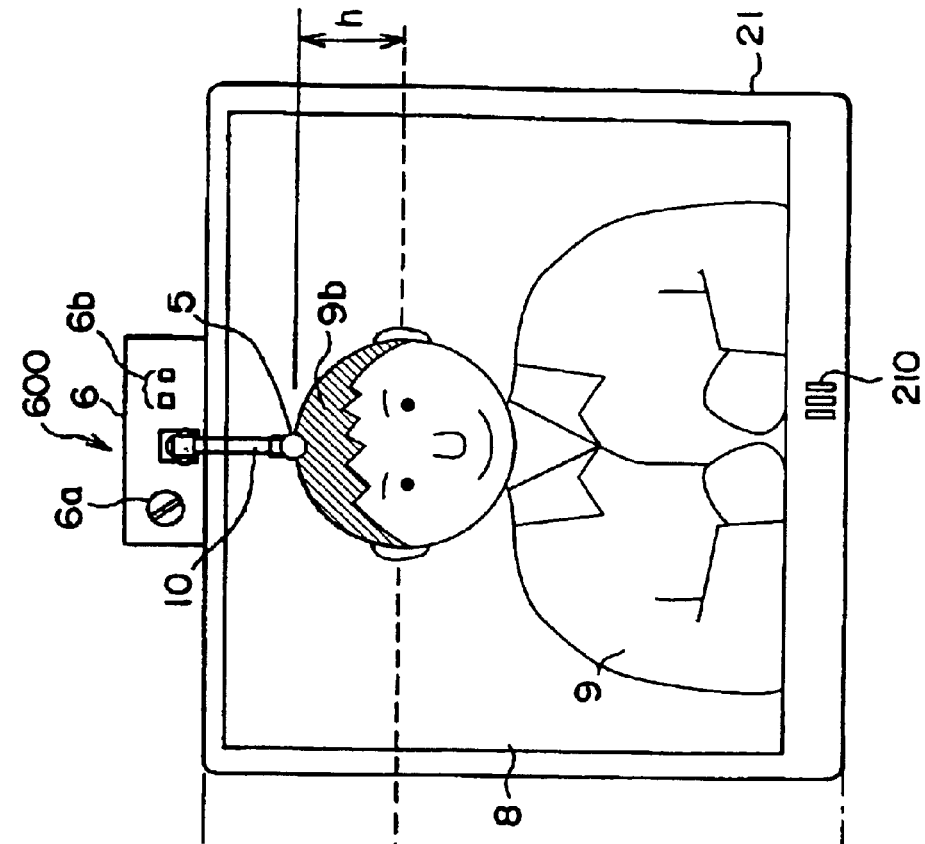
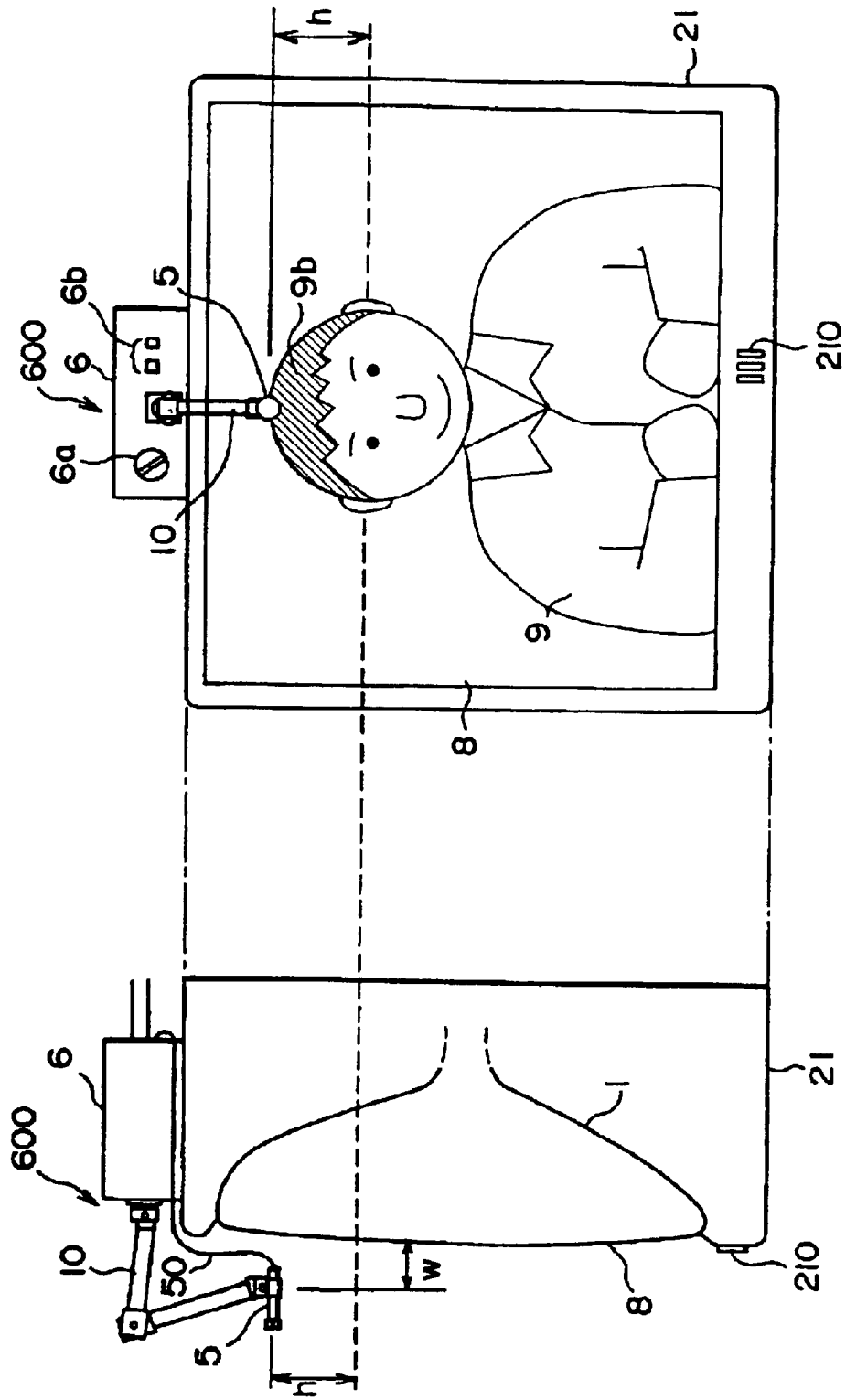

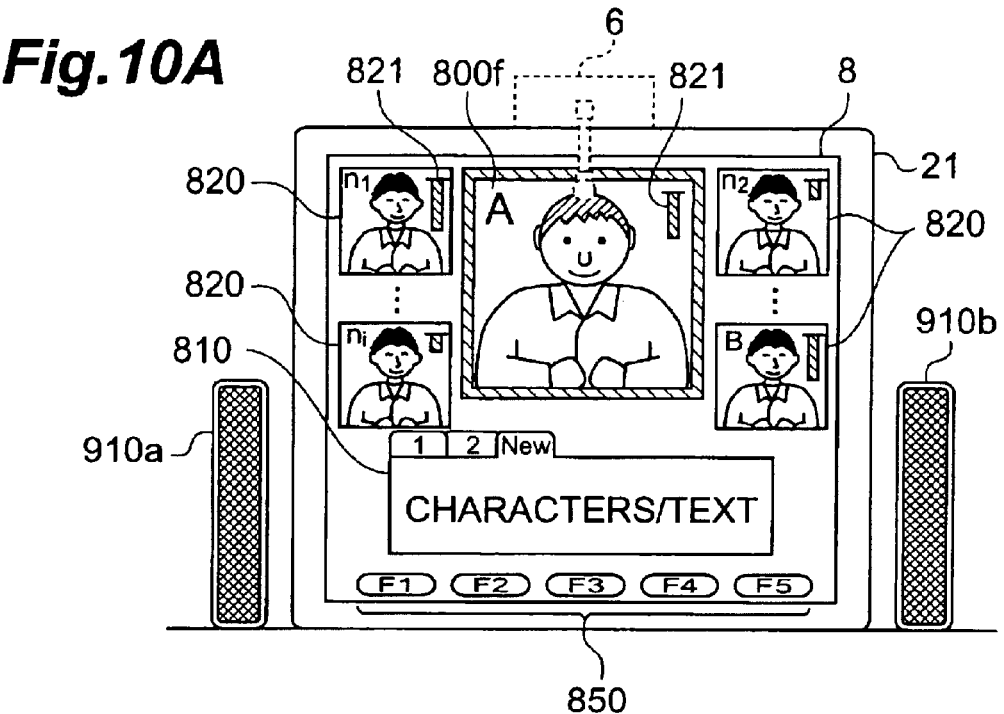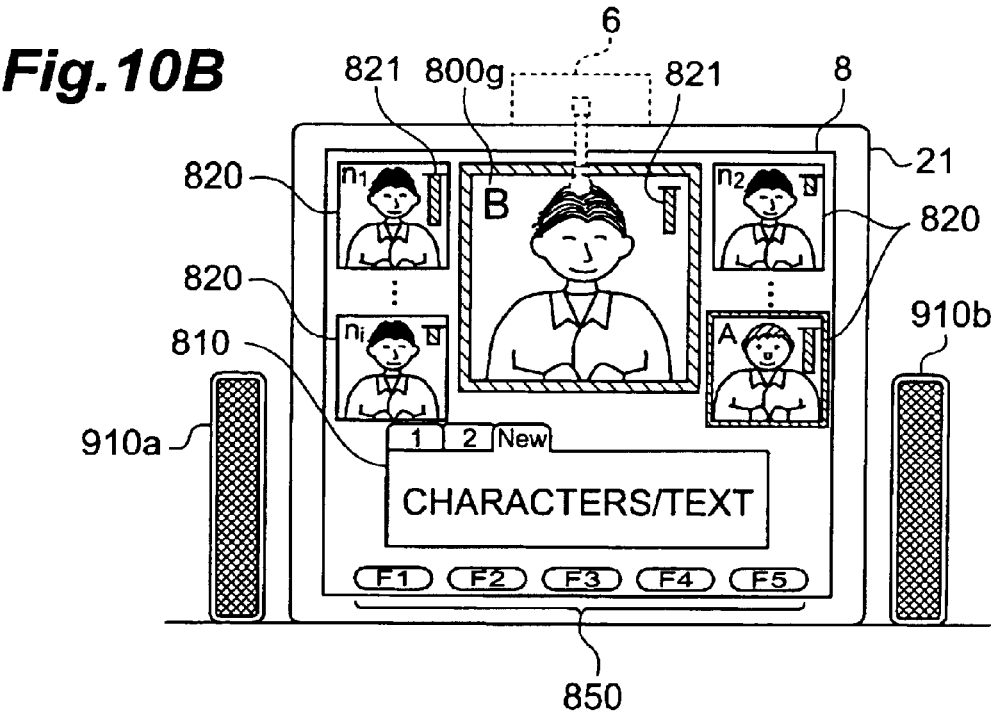

VIDEOCONFERENCE SYSTEM, TERMINAL EQUIPMENT INCLUDED THEREIN AND DATA DELIVERY METHOD

BACKGROUND OF THE INVENTION

1. Field of the Invention

The present invention relates to a videoconference system and others for transmitting and receiving data based on several types of media among a plurality of terminal devices connected by predetermined transmission means.

2. Related Background Art

In recent years, two-way interactive systems have been constructed to implement distance interlocution while transmitting and receiving text data and/or video data between remote places through transmission means like learning of foreign languages such as English conversation, counseling, and so on. Regarding such distance interlocution, the two-way interactive systems enabling the distance interlocution in an eye-contact state were proposed as systems for, while realizing simple transmission of text data and partner interlocutor images, also realizing a closer interlocution environment in an indirect eye-contact state through partner interlocutor images indicating respective interlocutor, for example, as disclosed in U.S. Pat. Nos. 6,137,526 and 6,005,604.

SUMMARY OF THE INVENTION

The Inventors investigated the conventional two-way interactive systems and found the following problem. Namely, the conventional two-way interactive systems realizing the distance interlocution were configurations suitable for one-to-one two-way interaction and, in application thereof to multipoint connection type videoconferencing systems for many users to participate simultaneously through their respective terminal devices, smooth progress of interlocution was not ensured by the structure for the participants to share the same interlocution information. Specifically, in the case of videoconferences of workshops, distance learning, etc. making use of the conventional two-way interactive systems, as participants increased, for example, up to ten to twenty people, the delivery of interlocution information of interlocutor images and others in real time exceeded the limits of image processing performance and transmission performance in the current communication infrastructure, and it was thus hard to implement real-time distance interlocution among many people by making use of the multipoint videoconference systems. It was also found that there were differences in degree of disclosure of information about interlocution among participants. The "information about interlocution" stated herein refers to any output information, e.g., texts associated with interlocution, graphics, a record of attendance, audio information (BGM), etc., as well as the voices and images of interlocutors.

The present invention has been accomplished in order to solve the problem discussed above, and an object of the invention is to provide a videoconference system of structure for enabling smooth progress of interlocution by granting each participant an option of information disclosure, even in distance interlocution among many people through a plurality of terminal devices, terminal equipment in the videoconference system, a data delivery method, a computer program configured to execute the data delivery method, and a recording medium containing a record of the computer program.

The videoconference system according to the present invention encompasses a multipoint connection type two-way interactive system for implementing transmission and reception of data based on plural types of media such as face images, voices, characters, slides, sound, music, etc. through a plurality of terminal devices connected by predetermined transmission means, and has the structure enabling smooth progress of interlocution even in the distance interlocution among many people through the plurality of terminal devices.

Specifically, the videoconference system according to the present invention comprises a management table for managing participation modes of respective participants, and communication control means for editing information to be delivered to each participant. The management table manages users of the respective terminal devices, which were preliminarily registered as participants, in a state in which the users are sorted in an interlocutor mode for interlocutors mainly engaged in progress of a specific subject and in an observer mode for observers other than the interlocutors. The communication control means delivers information necessary for two-way interlocution to the terminal device of each user sorted in the interlocutor mode, in real time, while the communication control means separately edits information by media selected among information associated with the interlocution between interlocutors sorted in the interlocutor mode, as delivered information, and delivers the edited information to the terminal device of each user sorted in the observer mode. The media of edited information may be those selected preliminarily or during progress of a conference by each user sorted in the observer mode.

The videoconference system according to the present invention has been completed with focus on the feature of multipartner conferencing that in a conference among many people, generally, two or three participants directly took part in interlocution on each of subjects varying with progress of the conference and the other participants were not directly involved in the interlocution itself. Data with different transmission loads is delivered to the terminal users directly participating in the interlocution on each of subjects varying with time and to the terminal users observing the interlocution (each participant is granted an option of disclosed information), whereby the distance interlocution is implemented among multiple points by making use of the maximum performance of the current communication infrastructure.

In accordance with a mode switch request from a user sorted in the interlocutor mode or in the observer mode, the communication control means can rearrange the mode information managed by the management table so as to re-sort one of the users sorted in the interlocutor mode, into the observer mode and so as to re-sort the user sorted in the observer mode, into the interlocutor mode. This configuration implements data communication almost like real progress of conferencing between interlocutors under direct interlocution on each of subjects varying with time.

The communication control means may be configured to receive comment information transmitted from the terminal device of a user sorted in the observer mode and deliver the comment information to the terminal device of a user as a receiver among those sorted in the interlocutor mode. In this case, the communication control means delivers the comment information to the terminal devices of other users sorted in the observer mode, in accordance with an instruction of disclosure/nondisclosure of the comment information from the user sorted in the observer mode, given by the user sorted in the interlocutor mode. The communication control means may deliver interlocution-associated information containing at least information to specify the current interlocutors and attendance information of the observers, an inquiry request, and a interlocution switch request to each user's terminal device, and this interlocution-associated information may further contain the number of transmissions of the comment information and a remaining time of the interlocution.

The videoconference system of the above-stated structure comprises a plurality of terminal devices; and the communication control means can be a server including a separately prepared computer for delivery of data on the predetermined transmission means, or one of the terminal devices of the users may function as the communication control means. Particularly, the terminal equipment according to the present invention preferably has a structure for implementing eye contact in the distance interlocution at least between the users sorted in the interlocutor mode, for transfer and perception of abundant emotions. In this case, at least one of the terminal devices in the videoconference system preferably comprises a display unit for displaying at least an image of a partner user sorted in the interlocutor mode among the participants; and an image pickup unit, such as a CCD camera, for picking up an image of a user located in front of the display unit; the image pickup unit is placed at a location where the user and the partner user can achieve eye contact through the image of the partner user displayed on the display unit (i.e., the image pickup unit is placed in front of the display unit in a state in which the image pickup unit overlaps the partner user image in part).

The data delivery method according to the present invention is a data delivery method adapted to the communication system configured to implement transmission and reception of data based on several types of media through a plurality of terminal devices connected by predetermined transmission means, as described above.

Specifically, the data delivery method according to the present invention comprises the steps of: managing users of respective terminal devices in a state in which the users are sorted in an interlocutor mode for interlocutors mainly engaged in progress of a specific subject and in an observer mode for observers other than the interlocutors; editing interlocution information by media selected from interlocution information among the users sorted in the interlocutor mode; and delivering the edited information to the terminal device of each user sorted in the observer mode. The media of the edited information may be preliminarily selected, or individually selected during progress of conferencing by each user sorted in the observer mode. Preferably, the participants are those preliminarily registered.

In the data delivery method according to the present invention, when a mode switch request is made from a user sorted in the interlocutor mode or in the observer mode, re-sorting may be done so as to re-sort one of the users sorted in the interlocutor mode, into the observer mode and re-sort the user having made the mode switch request, into the interlocutor mode. When comment information associated with the interlocution is transmitted from the terminal device of a user sorted in the observer mode, the comment information may be delivered to the terminal device of the user as a receiver among the users sorted in the interlocutor mode. At this time, the comment information transmitted is delivered to the terminal devices of other users sorted in the observer mode, in accordance with an instruction of disclosure/nondisclosure of the comment information given by the user sorted in the interlocutor mode.

Furthermore, in the data delivery method according to the present invention, interlocution-associated information containing at least information to specify the current interlocutors and attendance information of the observers may be delivered to each user's terminal device. This interlocution-associated information may contain the number of transmissions of the comment information and a remaining time of the interlocution.

The data delivery method as described above may be substantiated in the form of a program to be executed in a computer or the like; in this case, the program may be delivered through a wired or wireless network, or may be stored in a recording medium such as a CD, a DVD, a flash memory, or the like managed in the aforementioned server or terminal equipment.

BRIEF DESCRIPTION OF THE DRAWINGS

FIGS. 3A and 3B are a front view and a side view showing an image pickup device shown in FIG. 2, and views for explaining a setting method of a CCD camera for eye contact;

FIGS. 10A and 10B are illustrations for explaining an example of information media delivered to the terminal devices of the respective users sorted in the interlocutor mode, as a data delivery method carried out in the videoconference system according to the present invention (the data delivery method according to the present invention), which is applied to learning of conversation in a foreign language among multiple people;

DETAILED DESCRIPTION OF THE PREFERRED EMBODIMENTS

Embodiments of the videoconference system, terminal equipment, data delivery method, etc. according to the present invention will be described below in detail with reference to FIGS. 1, 2, 3A, 3B, 4–6, 7A–10B, 11, and 12. The same reference symbols will denote the same parts throughout the description of the drawings, without redundant description thereof.

Figure 1:
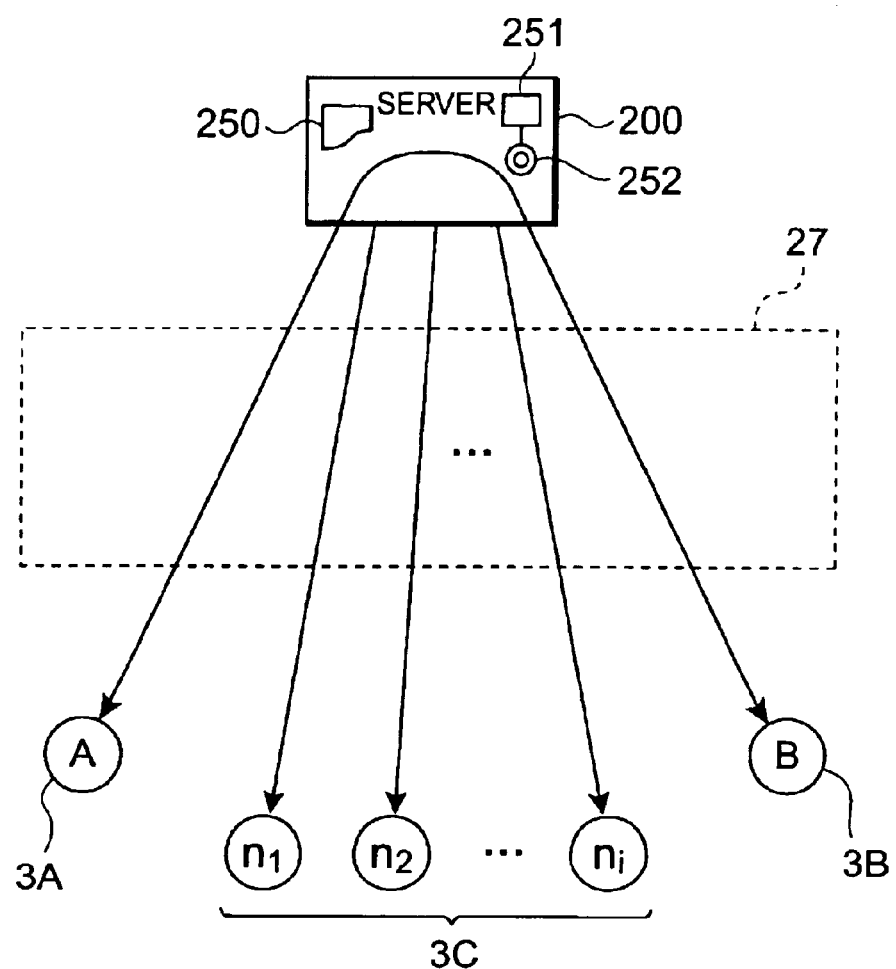
FIG. 1 is an illustration showing a schematic configuration of a videoconference system according to the present invention.

FIG. 1 is an illustration showing a schematic configuration of the videoconference system according to the present invention.

From the observation of interlocution circumstances in conferences among multiple people, normally, it can be readily confirmed that participants directly engaged in interlocution vary subject by subject and all the participants are not necessarily directly involved in interlocution about all the subjects. Also known as a special example is a conferencing form in which the participants are preliminarily sorted as a necessity into those directly engaged in interlocution and those observing the interlocution itself: for example, a case wherein one-to-one interlocution circumstances vary with time like a class between students and a teacher (a state in which questions and answers are individually exchanged between a teacher and a student A among a plurality of students); a case wherein, while one-to-one distance interlocution is carried out between a counselor role and a client role preliminarily selected from counseling apprentices like counseling training, the other counseling apprentices or a supervisor observes the training scene; and so on. In addition, there are a wide variety of applications, including a case wherein in counseling on supervision other counselors take part and learn; a case wherein, during distance group counseling in which a counselor is counseling a client about trouble thereof, other clients involved in similar trouble participate and observe the counseling; distance interpretation in interlocution among different language speaking people; distance relay translation of successive translations between a plurality of different languages, and so on. The videoconference system according to the present invention makes use of the difference between the interlocution circumstances of the participants (the difference between participation modes) specific to the conferences among many people to change delivered information media so as to provide optimal information to each of the participants different in the participation modes, thereby decreasing the loads on the communication infrastructure and implementing smooth distance interlocution in videoconferencing among many people.

Specifically, the videoconference system according to the present invention embraces a multipoint two-way interactive system, as shown in FIG. 1, which is configured to implement transmission and reception of data based on several types of media, e.g., video, audio, slide images, text data, synthetic data of these, etc. of terminal users, through a plurality of terminal devices connected by predetermined transmission means 27, and has a structure enabling smooth progress of interlocution even in distance interlocution among many people through the plurality of terminal devices.

The videoconference system according to the invention is provided with a server 200, including a computer, as communication control means to deliver different information to each of the participants as described above. This server 200 is provided with a management table 250 for managing information of participation modes of participants to conference, a processor 251 to perform communication control, and a recording medium 252 in which a computer program for executing the data delivery method of the present invention and others is stored. Particularly, the management table 250 manages participants, for example, users 3A–3C of the respective terminal devices, which were preliminarily registered as participants to conference, in a state in which they are sorted in an interlocutor mode for interlocutors mainly engaged in progress of a specific subject and in an observer mode for observers other than the interlocutors. In FIGS. 1, 3A and 3B represent terminal users sorted in the interlocutor mode for interlocutors directly involved in the interlocution, and 3C terminal users sorted in the observer mode.

The above server 200 implements smooth distance interlocution by delivering information necessary for the two-way interlocution to the terminal devices of the respective users 3A, 3B sorted in the interlocutor mode, as communication control means. On the other hand, the server 200 separately edits as delivered information, information based on media selected from the information associated with the interlocution between the users 3A, 3B sorted in the interlocutor mode, and delivers the edited information to the terminal devices of the respective users 3C (n1, n2, . . . , ni) sorted in the observer mode. The edited information media may be those preliminarily selected, or those selected during progress of the conference by the respective users n1, n2, . . . , ni sorted in the observer mode.

As described above, the videoconference system is one accomplished with focus on the feature of the multipartner conferences that it is normally the case in the conferences among many people that two or three participants are directly engaged in interlocution on each of subjects varying with progress of conferencing and the other participants are not directly involved in the interlocution itself, and the system is configured to deliver data with different transmission loads to the terminal users directly participating in the interlocution and to the terminal users observing the interlocution on each of subjects varying with time, thereby implementing the distance interlocution among the multiple points by making use of the maximum performance of the current communication infrastructure.

In response to a mode switch request from a user sorted in the interlocutor mode or in the observer mode, the above server 200 rearranges the mode information managed by the management table 250, so as to re-sort one of the users sorted in the interlocutor mode, into the observer mode and re-sort a user sorted in the observer mode, into the interlocutor mode. This makes it feasible to implement the distance interlocution between users suitable for each of subjects varying with time, almost like real progress of conferencing.

The videoconference system of the structure as described above includes a plurality of terminal devices used by the participants, and the communication control means may be the server 200 separately prepared for delivery of data on the predetermined transmission means 27 as described above, or one of the terminal devices of the users.

The videoconference system and data delivery method according to the present invention can be substantiated by applying the two-way interactive systems for implementing the distance interlocution among terminal devices connected through predetermined transmission means, for example, as described in U.S. Pat. Nos. 6,137,526 and 6,005,604, and, particularly, are suitable for the multipoint connection type two-way interactive systems enabling eye contact between specific users.

First, a two-way interactive system applied to the videoconference system will be described below. The two-way interactive system is a system for implementing the distance interlocution based on one-to-one interaction in an eye-contact state, and it is also applicable to two-way interactive systems configured not to achieve eye contact between interlocutors and simply to be able to transmit and receive text data and/or image data.

Figure 2:
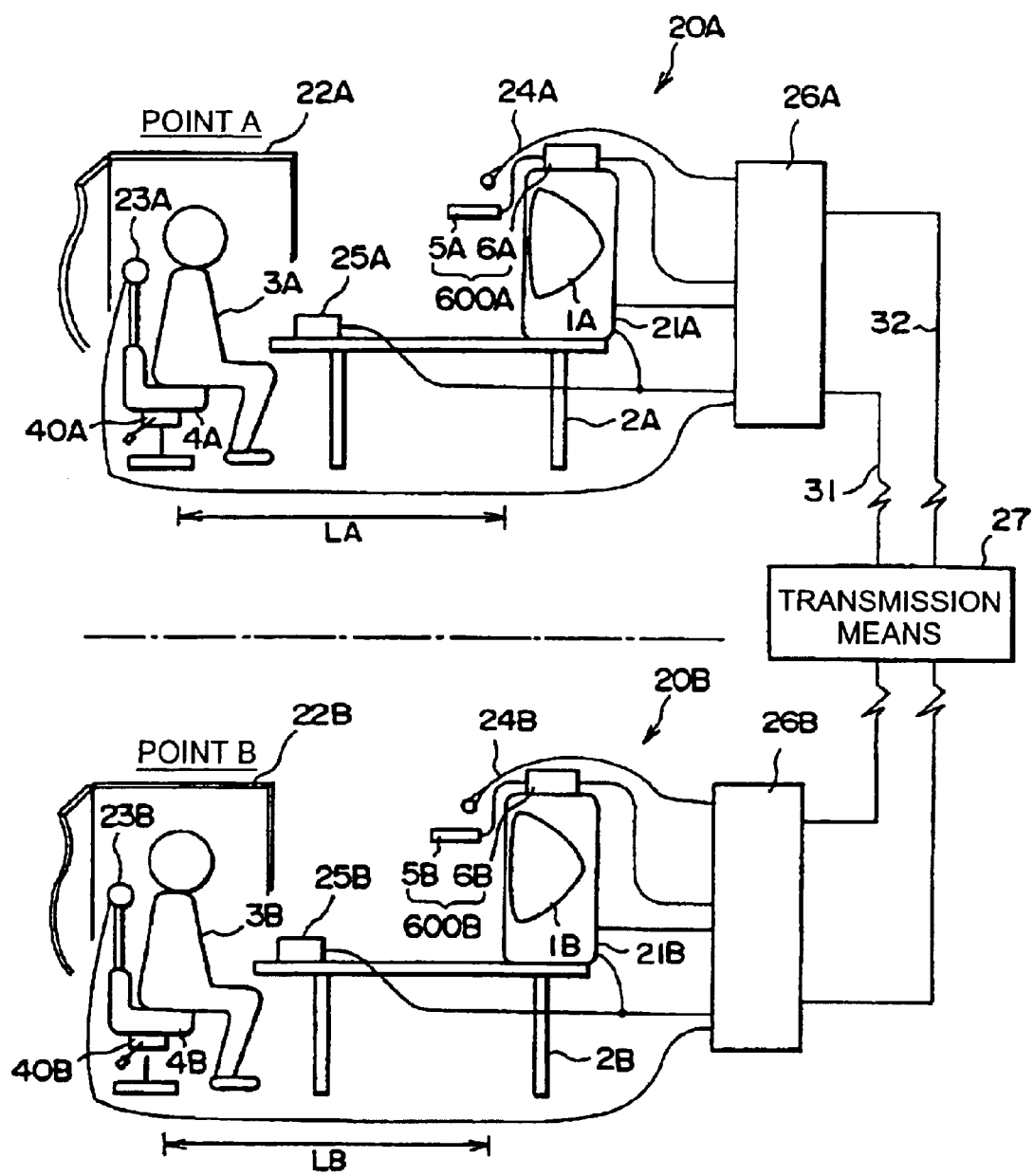
FIG. 2 is an illustration showing a configuration of a two-way interactive system achieving eye contact through transmission means between remote places.

FIG. 2 is a logical configuration diagram showing the entire two-way interactive system enabling eye contact between interlocutors located at remote places. This system is a system for implementing two-way interaction between the interlocutor 3A (first interlocutor) at point A (first point) and the interlocutor 3B (second interlocutor) at point B (second point). Particularly, since this system is a counseling system for establishing close relationship of trust even between interlocutors at remote places to realize in-depth communication or a system intended toward home learning, at least one interlocutor is assumed to be a counselor such as a teacher, a doctor, a psychologist, or the like. Therefore, this system is provided with various functions and configurations for providing information necessary for counseling by those counselors and for providing an ideal counseling environment. The system is also applicable to distance group counseling, distance group supervision, and distance interpretation and generally also to distance group learning.

Specifically, at point A, there are (a) a chair 4A (with height adjuster 40A) for the interlocutor 3A (e.g., a counselor) to sit on, (b) a table 2A at which the interlocutor 3A sits, and (c) a terminal device 20A with a mechanism for achieving eye contact between interlocutors through transmission means 27, and the interlocutor 3A is isolated by partition 22A. On the other hand, at point B, there are (a) a chair 4B (with height adjuster 40B) for the interlocutor 3B (e.g., a client undergoing counseling) to sit on, (b) a table 2B at which the interlocutor 3B sits, and (c) a terminal device 20B with a mechanism for achieving eye contact between interlocutors through transmission means 27, and the interlocutor 3B is isolated by partition 22B. Here the transmission means 27 includes an optical fiber transmission line 31 (main transmission line), a satellite communication transmission line 32 (backup transmission line), etc. for enabling transmission and reception of image data and audio data between the terminal device 20A at point A and the terminal device 20B at point B. The transmission means 27 may be either wired or wireless means. The transmission means embraces networks such as telephone line networks already installed and also embraces electronic Bulletin Board Systems (BBS) with various databases.

At point A, the aforementioned chair 4A functions for determining the position of the interlocutor 3A. This chair 4A is preferably fixed in order to keep the distance constant between the interlocutor and display unit 21A of the terminal device 20A. However, even in the case where the chair 4A is not fixed, it is also possible to keep the distance constant between the chair 4A and the display unit 21A, by setting the table 2A between the interlocutor 3A and the display unit 21A (the fact was confirmed that the existence of table 2A established a psychological standard of distance for the interlocutor 3A). The same also applies to the configuration of the terminal device 20B at point B where the partner interlocutor 3B (e.g., a counselee or the like) is present.

At point A, the terminal device 20A is provided with (1) a display unit 21A with monitor TV 1A located on the table 2A, for displaying the video of interlocutor 3B and others on the basis of the image information transmitted through the transmission means 27 from the terminal device 20B at point B; (2) an imaging unit 6A for capturing the video of interlocutor 3A picked up by CCD camera 5A, as image information and transmitting the information to the terminal device 20B at point B; (3) an audio output unit 23A (speaker) for outputting the voice of interlocutor 3B on the basis of audio information transmitted through the transmission means 27 from the terminal device 20B at point B; and (4) an audio input unit 24A (microphone) for collecting the voice of interlocutor 3A as audio information and transmitting the information to the terminal device 20B at point B. Furthermore, in order to implement more in-depth communication as a counseling system, the system is also provided with (5) a character/graphics input unit 25A (an interface such as a keyboard, a pointing device, a touch panel, or the like) for letting the interlocutor 3A input characters and/or graphics and letting the display unit 21A display the input characters and/or graphics, and for transmitting the character/graphics information to the terminal device 20B at point B; and (6) an image processor 26A (including a controller) disposed between the above components and the transmission means 27 and configured to perform signal processing, transmission control, editing works of video data, and so on. The terminal device 20B at point B is also configured in structure similar to that of the terminal device 20A at point A described above. Specifically, the terminal device 20B is provided with display unit 21B, image pickup device 600B consisting of CCD camera 5B and imaging unit 6B, audio output unit 23B, audio input unit 24B, character/graphics input unit 25B, and image processor 26B.

Furthermore, the structure of the image pickup devices 600A, 600B (image pickup means) will be described below in the terminal devices 20A, 20B at point A and at point B. For convenience sake of description, concerning the components common to the terminal devices 20A, 20B at point A and at point B, the letters A and B for discriminating the points from each other will be omitted, for example, like the image pickup device 600. Unless otherwise stated in particular, the terminal device 20A at point A will be described as a general rule, and redundant description will be omitted about the terminal device 20B at point B having the common configuration.

The image pickup device 600 is provided with a micromini CCD camera 5 (5A) being an image pickup unit, a support mechanism 10 (cf. FIGS. 3A and 3B) for locating the CCD camera 5 at a predetermined position in a supporting state, and an imaging unit 6 (6A) for controlling the CCD camera 5. The monitor TV 1 (1A) is mounted on the table 2 (2A) and the interlocutor 3 (3A) sits on the chair 4 (4A) with the height adjuster 40 (40A) placed a distance L (m) apart from the monitor TV 1. The distance L (LA) is set in the range of not less than 0.5 m nor more than 5 m. The cylindrical micromini CCD camera 5 with the outside diameter φ of not more than 20 mm and the length of approximately 100 mm is positioned between the interlocutor 3 to be imaged, and the monitor TV 1. The CCD camera 5 is set so that the direction of image pickup is directed to the interlocutor 3 to be imaged. Then the video of the interlocutor 3 picked up by the camera 5 is transmitted as image information from the imaging unit 6 to the other interlocutor side (i.e., transmitted through the transmission means 27 to the terminal device 20B at point B). A small deviation might occur in the distance between the display unit 21 and the interlocutor, depending upon the interlocutor. Therefore, in order to be adapted for such circumstances, the CCD camera 5 is preferably one selected from those with large depths of focus.

The specific location of the micromini CCD camera 5 will be described below with reference to FIGS. 3A and 3B.

First, the imaging unit 6 of the image pickup device 600 is placed on the display 21 for displaying the video of the other interlocutor transmitted thereto. The main body of this imaging unit 6 is provided with a changeover switch 6a for effecting changeover between display of the video of the interlocutor himself picked up by the camera 5 (the video being captured through camera cable 50 into the imaging unit 6) and display of the video of the other interlocutor 3B having been transmitted, and switches 6b for various adjustments. Switches 210 include a power switch for on/off of power of the monitor TV 1, and other switches. The CCD camera 5 is set at the predetermined position in front of monitor screen 8 displaying the image 9 of the other interlocutor 3B having been transmitted, by the support mechanism 10 (robot arm). The monitor screen 8 can be fully utilized in the size of approximately four inches.

Specifically, the CCD camera 5 is located at the position w (cm) ahead of the monitor screen 8 and in the vicinity of the head 9a of the interlocutor image 9 displayed on the monitor screen 8. The center axis of the cylindrical CCD camera 5 is located h (cm) above the position of the eyes of the interlocutor image 9 indicated by a dotted line.

Since the micromini CCD camera 5 is located in the vicinity of the head and above the position of the eyes of the interlocutor image 9 displayed on the screen 8 of the large-scale monitor TV 1 as described above, it will cause no particular trouble in two-way interlocution. For example, in the case of a system configuration in which the CCD camera 5 is located h=about 10 (cm) above the position of the eyes of the interlocutor image 9 (the position indicated by the dotted line in the figures) displayed on the screen 8 and in which the distance L is about 2.5 (m) between the monitor TV 1 and the interlocutor 3, the parallax angle is 2.3°, which can be adequately lower than the detection limit, or parallax angle 3° (even if the space w between the monitor screen 8 and the CCD camera 5 is about 10 (cm), there occurs no particular influence on variation of parallax angle). Namely, it was confirmed that, as long as the interlocutor could clearly see the partner's eyes (the eyes in the image of the other interlocutor 3B displayed on the monitor screen 8) in the eye-contact state, the existence of the micromini camera 5 around the head thereof caused little trouble in two-way interlocution if the screen 8 of the monitor TV 1 was large enough. It was also confirmed by experiment that the size of the screen 8 enough to implement good two-way interlocution was the size of about 35 cm horizontal and 26 cm or more vertical. There was also obtained the result that psychological trouble tended to decrease even in the small size of the screen if the interlocutors were acquaintances to each other. Therefore, the screen size can be determined according to applications.

Figure 4:
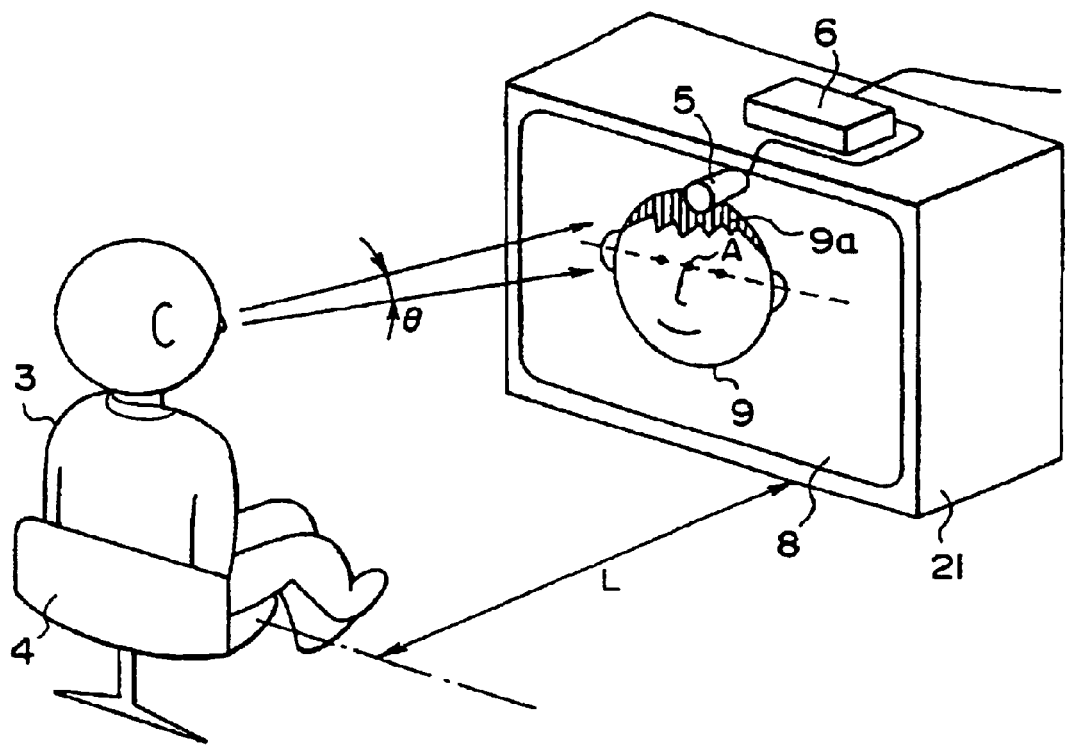
FIG. 4 is an illustration for explaining the parallax angle.
Figure 5:
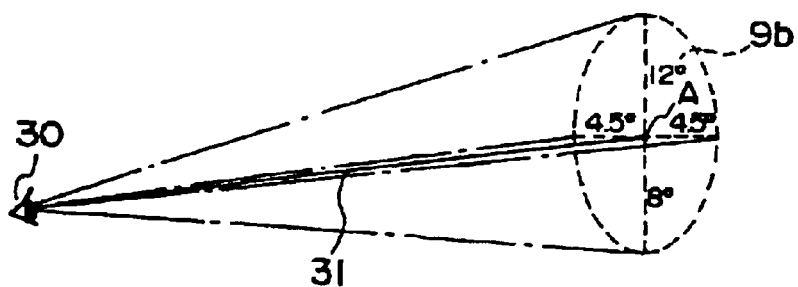
FIG. 5 is an illustration showing a region in which the CCD camera should be set.

Furthermore, the parallax angle will be described with reference to FIG. 4. In the present specification, the parallax angle refers to an angle θ between the visual axis of the interlocutor 3 to be imaged, which is directed toward the interlocutor image 9 displayed on the monitor screen 8, and the visual axis of the interlocutor 3 directed toward the CCD camera 5, as shown in FIG. 4. In other words, the parallax angle represents a deviation angle of the installation location of the CCD camera 5 from the visual axis of the interlocutor 3. The eye contact stated herein means that the deviation angle falls within the tolerance to unnaturalness due to the setting location of the CCD camera 5, as reported in 1967 Joint Meeting of Four Electric Institutes (No. 1998). Quantitatively, the eye contact is defined within the eye contact range in which the parallax angle is not more than 4.5° horizontal (on each of the both temple sides of the image 9 with respect to the center A between the eyes of the interlocutor image 9), not more than 12° in the immediately above direction (on the head 9b side of the image 9 with respect to the image center A), and not more than 8° in the immediately below direction (on the body side of the image 9 with respect to the image center A). It is a matter of course that the parallax angle is preferably as small as possible, and it is reported that the detection limit is not more than 3° horizontal and vertical. Accordingly, the area in which the CCD camera 5 can be set is a conical region shown in FIG. 5. This conical region is defined by an eye-contact zone 9b on the monitor screen 8 at the predetermined distance L (m), with respect to the visual axis 31 of the interlocutor 3 connecting the eye 30 of the interlocutor 3 to the center point A of the interlocutor image 9 displayed on the monitor screen 8 (in the present embodiment, the center between the both eyes of the interlocutor image 9 is defined as the center point A of the interlocutor image 9), and by the position of the eyes 30 of the interlocutor 3.

If the size of the interlocutor image 9 displayed on the monitor screen 8 is small, the CCD camera 5 does not necessarily have to overlap the head of the interlocutor image 9. Otherwise, the head of the interlocutor 9 is located behind the CCD camera 5 to cause trouble in view. As described above, the condition for eye contact is that the CCD camera 5 and the eyes of the interlocutor image 9 are present within the region of the parallax angle of 3° and, specifically, the distance between them is approximately 3 cm (h in FIGS. 3A and 3B) at the position 50 cm apart from the screen. Accordingly, the eye-contact state can be maintained within this range even with some shift between the CCD camera 5 and the head of the interlocutor image 9. This shift between the interlocutor image 9 and the CCD camera 5 can be implemented, for example, by adjusting the image display position on the monitor screen 8 or by adjusting the support of the CCD camera 5 to change the position of the CCD camera 5 itself.

Figure 6:
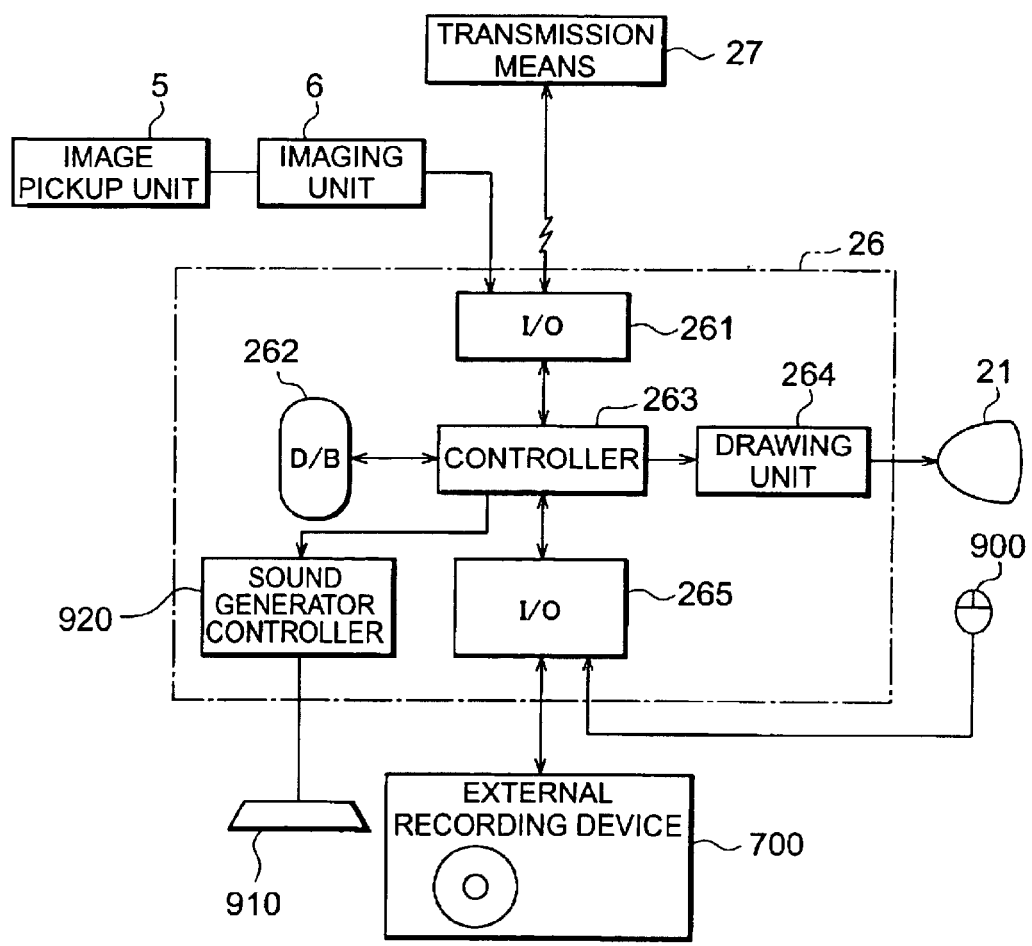
FIG. 6 is a block diagram showing a configuration of the terminal equipment according to the present invention.

FIG. 6 is a diagram showing a schematic configuration of the terminal equipment according to the present invention. The terminal equipment is provided with a display unit 21 such as a monitor (corresponding to the displays 21A, 21B in the two-way interactive system shown in FIG. 2); an image processor 26 (corresponding to the image processors 26A, 26B in the two-way interactive system shown in FIG. 2); an external recording device 700; a pointing device 900 such as a mouse; an image pickup device 600 consisting of an image pickup unit such as the CCD camera 5 or the like and an imaging unit 6 for picking up the image of the interlocutor located in front of the display unit 21; a sound generator controller 920 and a speaker 910 for outputting the voice of participants. The image processor 26 is provided with a data input/output unit 261 (I/O in the figure) for taking in the image information from the imaging unit 6 in the image pickup means and/or other information media and for implementing transmission and reception of image information of the partner interlocutor through the transmission means 27; a controller 263; a database 262 (D/B in the figure) for storing the image information transmitted and received, and also storing character data, video data, etc. preliminarily prepared by the interlocutor himself; a drawing unit 264 for letting the display unit 21 display a predetermined pattern according to an instruction from the controller 263; and a data input/output unit 265 (I/O in the figure) for taking in location information from the pointing device 900 such as the mouse and for exchanging data with the external recording device 700. The external recording device 700 includes a recording medium, for example, such as a magnetic tape, a CD, an optical disk, a hard disk, a DVD, a flash memory, or the like. This recording medium may store a computer program that executes the data delivery method according to the present invention.

When the terminal equipment functions as server 200, the controller 263 functions as the communication control means and the management table 250 is stored in D/B 262.

An example of a workshop about counseling between remote places will be described below as a specific example of the data delivery method by the videoconference system shown in FIG. 1. The configuration among terminal devices of respective participants is much the same as the two-way interactive system shown in FIG. 2.

This videoconference is a case in which a counselor (reporter) talks to a supervisor about a counseling situation thereof and is instructed by the supervisor. In this case, other counselors (observers) also attend the videoconference for the purpose of reference, and each counselor getting his or her turn reports his or her own counseling situation similarly and asks for supervisor's advice. In this videoconference, therefore, the server 200 sorts the counselor as a reporter and the supervisor in the interlocutor mode and the other counselors awaiting their turn, in the observer mode, and the information is recorded in the management table 250.

Figure 7A:
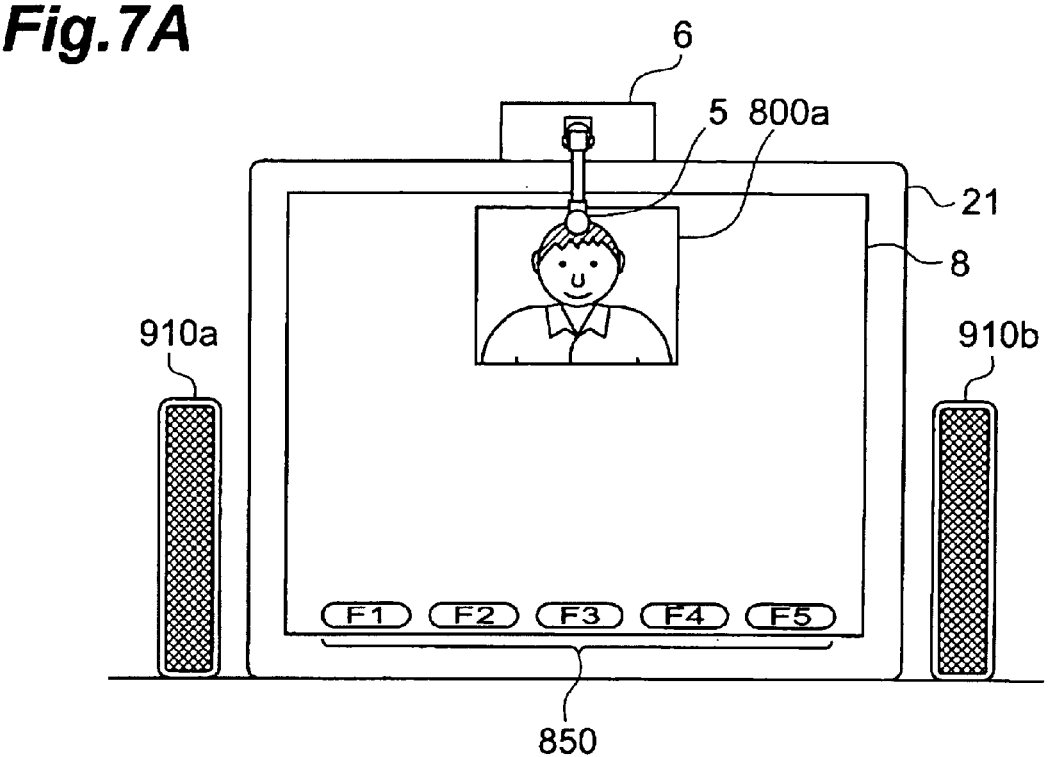
FIGS. 7A and 7B are illustrations for explaining an example of information media delivered to the terminal devices of the respective users sorted in the interlocutor mode, as a data delivery method carried out in the videoconference system according to the present invention (i.e., the data delivery method according to the present invention)
Figure 7B:
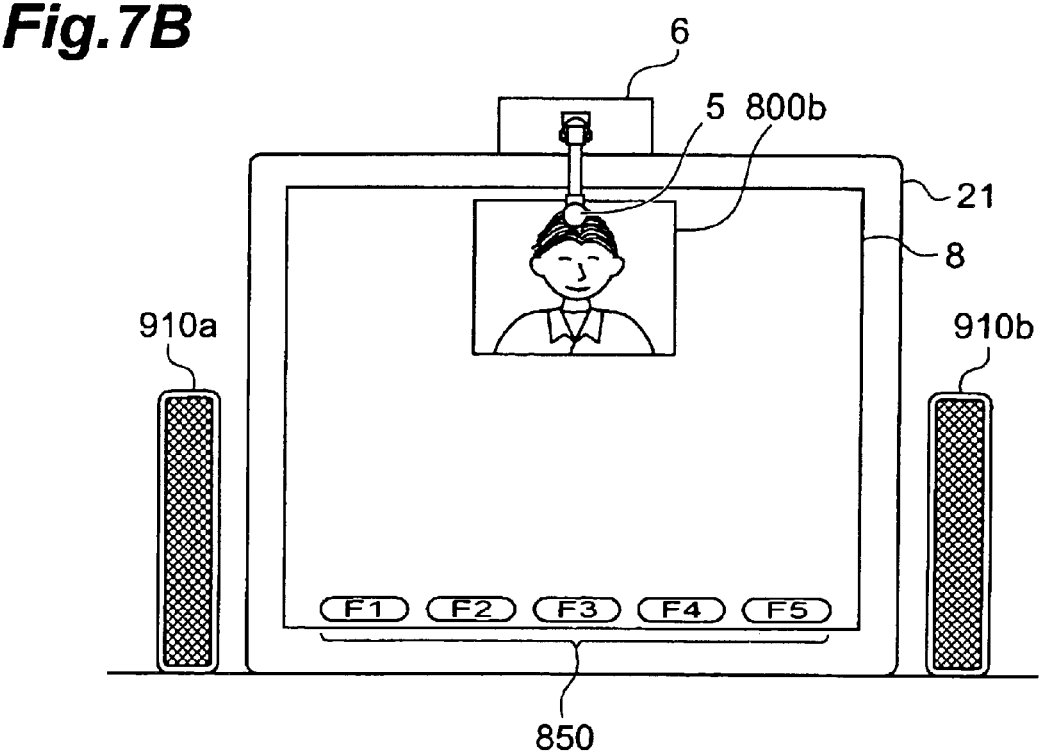

First, the report and counsel under the eye-contact condition is preferable between the reporter and the supervisor to enhance smooth interaction of feeling and thinking. FIGS. 7A and 7B are diagrams for explaining an example of information media delivered to the terminal devices of respective participants sorted in the interlocutor mode, as a data delivery method carried out in the videoconference system according to the present invention (the data delivery method according to the present invention).

Namely, a counselor as a reporter is provided, as shown in FIG. 7A, display of video 800a of the supervisor in an overlapping state with the CCD camera 5 on the monitor screen 8, while the supervisor is also provided, as shown in FIG. 7B, display of video 800b of the reporter in an overlapping state with the CCD camera 5 on the monitor screen 8, whereby the eye-contact state is established between the reporter and the supervisor. Each of the terminal devices of the reporter and supervisor has structure similar to that of FIG. 6. As shown in FIGS. 7A and 7B, each terminal equipment is provided with speakers 910a, 910b for outputting respective voices of the reporter and supervisor, and button characters 850 for giving instructions of entry of a comment, switching of an interlocutor, and disclosure/nondisclosure of delivered information during interlocution are displayed on the monitor screen 8 of each terminal equipment. The participants sorted in the interlocutor mode can be three or more people, and videos of plural people may be displayed on the monitor screen 8 according to selection by each participant.

Figure 8A:
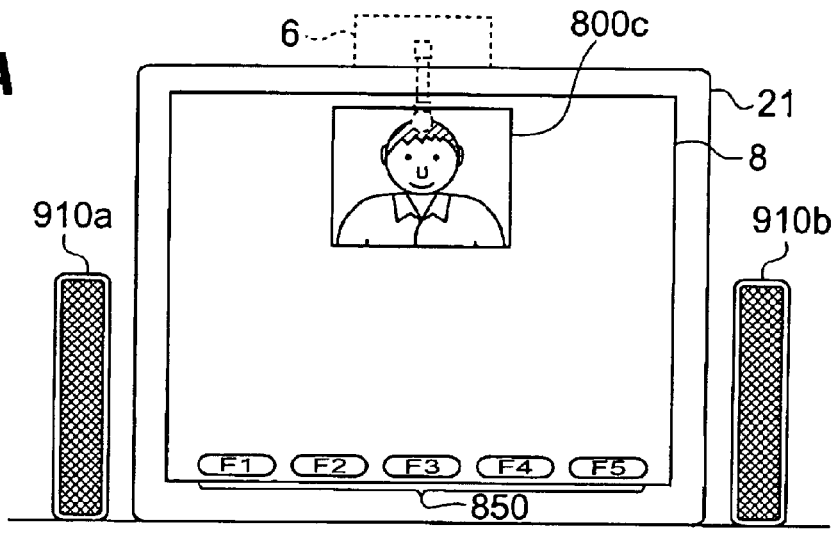
FIGS. 8A–8C are illustrations for explaining an example of information media delivered to the terminal devices of the respective users sorted in the observer mode, as a data delivery method carried out in the videoconference system according to the present invention (i.e., the data delivery method according to the present invention)

On the other hand, during a report by a counselor, as shown in FIG. 8A, video 800c of the reporting counselor (in the interlocutor mode) is displayed on the monitor screen 8 in the terminal equipment of the other counselors sorted in the observer mode, and the voice of the supervisor (in the interlocutor mode) is outputted from the speakers 910a, 910b. The different information media of video and audio are once edited in the server 200 and delivered to the terminal of each counselor sorted in the observer mode. Thanks to this arrangement, while a counselor is asking the supervisor questions during a report, the other counselors sorted in the observer mode can understand the questions and answers, without causing incompatibility in observation between the counselor and the supervisor.

Figure 8B:
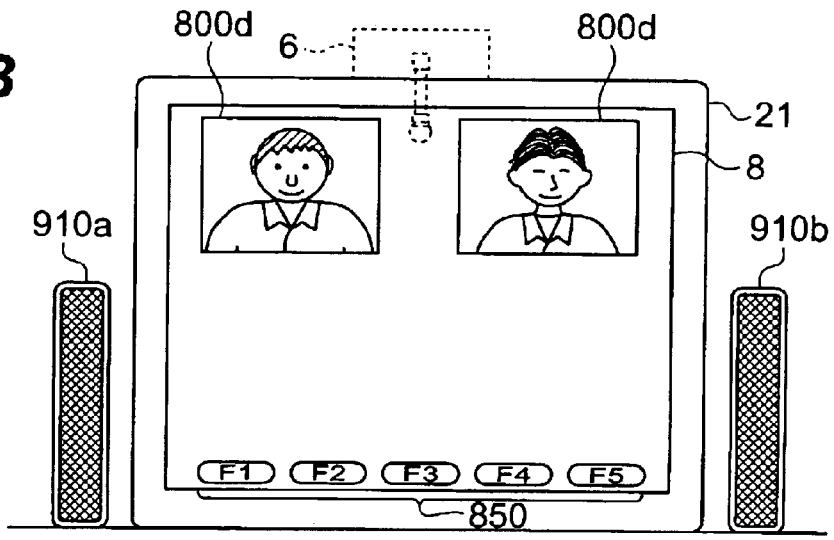
Figure 8C:
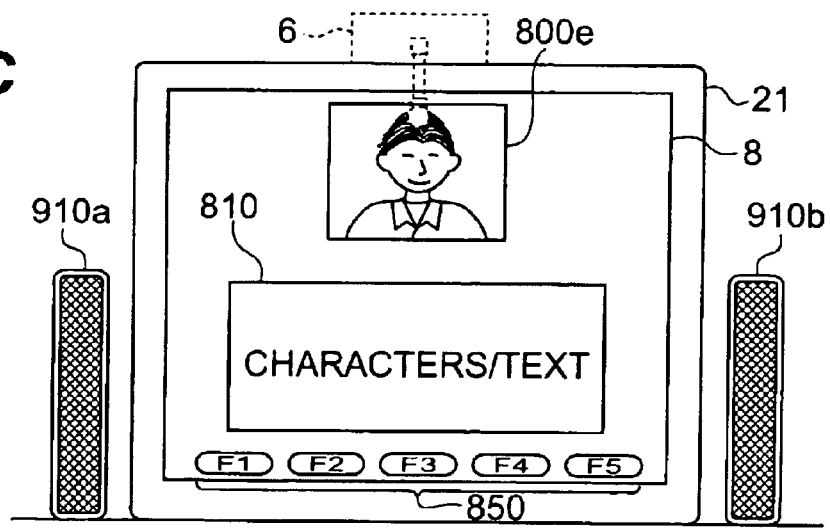

Each of the other counselors sorted in the observer mode is allowed to select information to be displayed on the monitor; for example, video or still images of both the counselor as a reporter and the supervisor can be displayed with their voices (cf. FIG. 8B). In addition, as shown in FIG. 8C, a window 810 for entry of a comment may also be displayed together with the video of the counselor in interlocution. FIGS. 8A to 8C are illustrations for explaining an example of the information media delivered to the terminal equipment of each user sorted in the observer mode, as a data delivery method carried out in the videoconference system according to the present invention (the data delivery method according to the present invention). A pattern indicating a participation mode of a participant may be displayed on the monitor screen 8 in the terminal equipment of each participant.

Subsequently, the report by the counselor is completed and then the interlocution goes into a situation in which the counselor is advised by the supervisor; the video of the supervisor is displayed instead of the video of the counselor as a reporter on the monitor screen 8 presented to the other counselors sorted in the observer mode, while the voice of the counselor as a reporter is outputted from the speakers 910a, 910b.

When the counsel by the supervisor is finished, at least either of the counselor and supervisor reads comment information transmitted and makes a reply of an answer comment to necessary comment information. At this time, the comment information transmitted and received can be transmitted and received either anonymously or onymously. In the anonymous case, disclosure of the information to each counselor in the observer mode is effective to progress of interlocution. When one of the other counselors in the observer mode desires to cut into the interlocution, or desires to provide information, the server 200 switches the participation mode of the counselor requesting the interruption, into the interlocutor mode in place of either the counselor as a reporter or the supervisor, thereby replacing the participant in the interlocutor mode with another. Each participant is allowed to select information media delivered and, if the counselor requesting the interruption selects information delivery of only voice, the counselor can join the two-way interlocution between the counselor of the reporter and the supervisor by only voice, without switching the participation mode of each participant.

In the videoconference as described above, the delay of information delivery between interlocutors is preferably controlled at or below 0.3 second during one-to-one two-way interlocution between the participants in the interlocutor mode, but the delivery delay of approximately one to five seconds occurs in the delivery of information to the participants sorted in the observer mode, because the information is once edited on the server 200 side. However, the delivery delay of this level leads to no fatal system failure, because the delivery is not one to the participants sorted in the interlocutor mode under direct interlocution. Some trouble can occur at the timing of inviting questions or at the timing of switching between the participation modes, but the delay is considered to be within tolerance in practical use.

Particularly, the delivery service of comment information transmitted during distance interlocution between specific interlocutors (with a function of responding to the comment information transmitted) is significantly effective in overcoming the delivery delay and in efficiently advancing the videoconference itself.

Since the videoconference system as described above enables the interlocution with partners of about a hundred to a thousand participants, questions can be limited to two per person or the setting time for questions can be limited to three minutes per person, whereby questions and dialogues by some limited persons can be preliminarily controlled on a software basis. The comment information transmitted may be transmitted by the voice mail function and in this case, there is no need for a corresponding input work such as input with a keyboard or input with a pen. Preferably, the transmitter can modify or delete the comment information once transmitted. Furthermore, it is preferable that a reply be sent along with a receipt number to each comment information transmitted, because anonymousness (in the case where each participant is named with a corresponding receipt number) is enhanced in the conference.

Figure 9A:
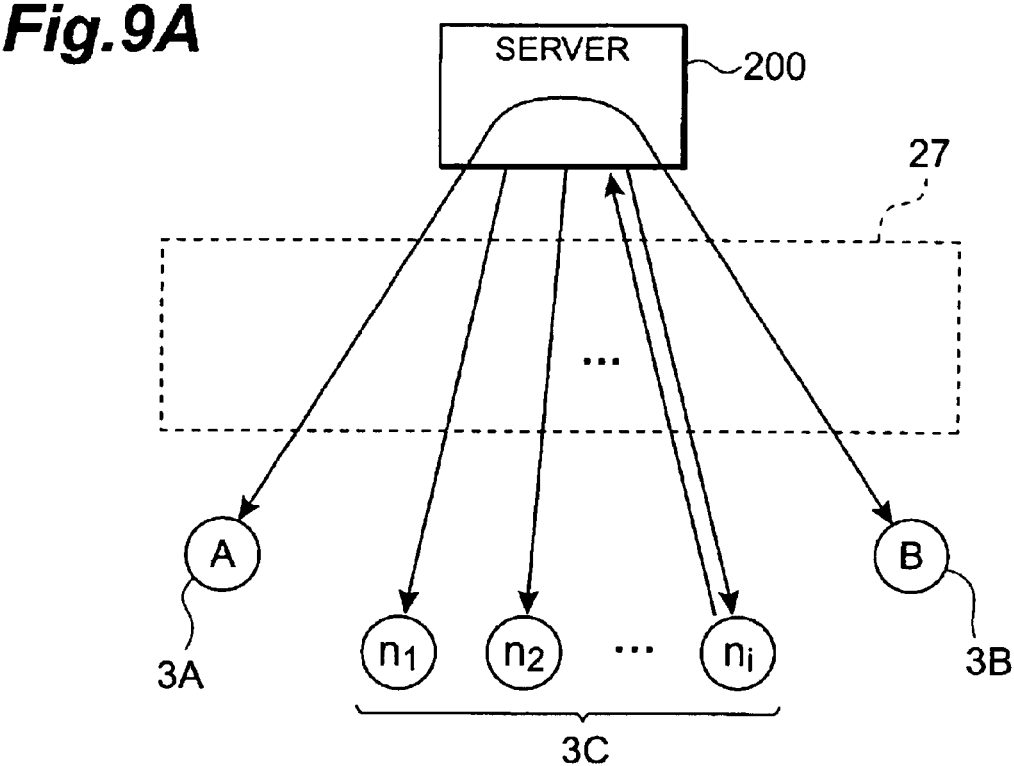
FIGS. 9A and 9B are illustrations for explaining a participation mode switch operation in the videoconference system according to the present invention.
Figure 9B:
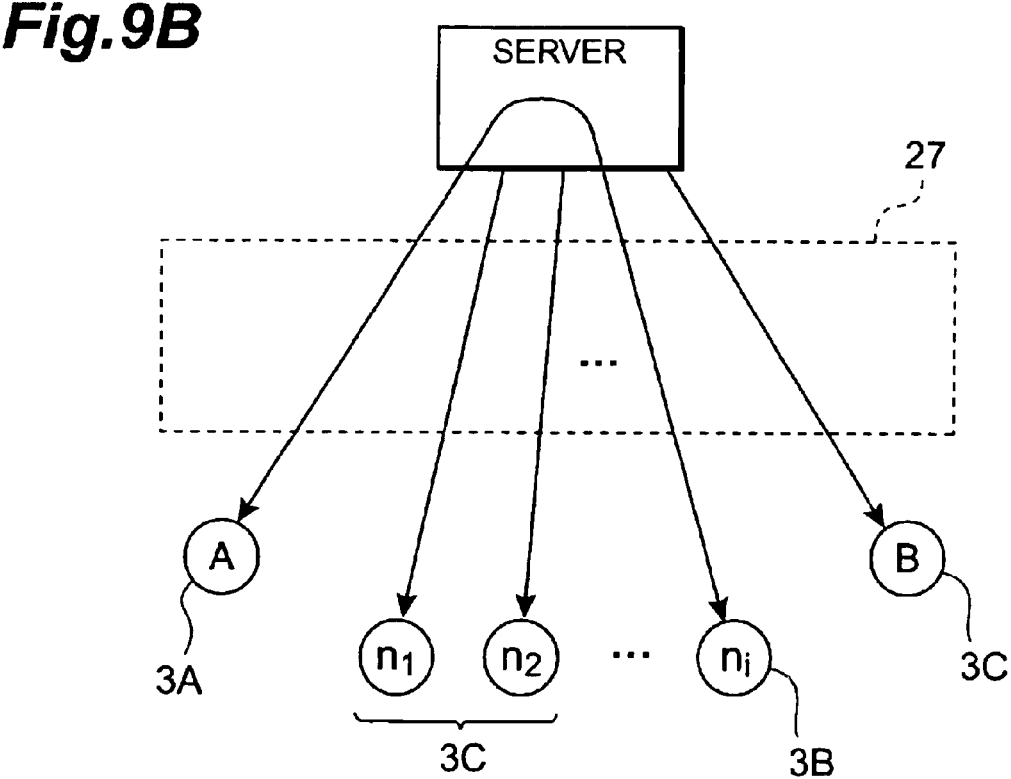

The participation mode switching operation will be described below in the videoconference system according to the present invention. FIG. 9A shows a data delivery state before switching of the participation modes and FIG. 9B a data delivery state after switching of the participation modes.

First, the data delivery state shown in FIG. 9A is a situation in which the participant 3A and the participant 3B are engaged in two-way interlocution in the eye-contact state while the other participants 3C are observing this two-way interlocution. In this state, the server 200 delivers the video and audio of the partner participant (interlocutor) to each participant 3A or 3B, while the server 200 once edits the delivered information based on information media selected by each of the other participants 3C (n1, n2, . . . , ni) and delivers the edited information to each of the participants 3C. This delivered information can be limited, for example, to only audio, combination of characters with audio, combination of still imagery with audio, and so on. The server 200 manages the participation modes of the respective participants in the management table. Specifically, the information is recorded in the management table 250 in a state in which the participants 3A, 3B are sorted in the interlocutor mode and the participants 3C in the observer mode.

When in the data delivery state as described above, a participant ni sorted in the observer mode sends a mode switch request S1 to the server 200 (cf. FIG. 9A), the server 200 updates the contents of the management table 250. Namely, the server 200 changes the participant 3B in the interlocutor mode into the observer mode and updates the participant ni in the observer mode into the interlocutor mode. Then the server 200 delivers the video and audio of the partner participant (interlocutor) to the participant ni newly sorted in the interlocutor mode and to the participant 3A according to the contents of the management table 250 thus updated. On the other hand, the server 200 once edits the delivered information based on information media selected by each of the participant 3B newly sorted into the observer mode and the other participants n1, n2, . . . and delivers the edited information thereto (cf. FIG. 9B).

An example of learning of conversation in a foreign language between remote places will be described as a specific example of the data delivery method by the videoconference system shown in FIG. 1. The configuration among the terminal devices of the respective participants is much the same as the two-way interactive system shown in FIG. 2.

This videoconference is a case in which a teacher successively asks each of students questions and others. In this case, a student without chances of conversation with the teacher goes into conversation with the teacher similarly at his or her turn. In this videoconference, therefore, the server 200 sorts the teacher and the student in conversation therewith into the interlocutor mode, sorts the other students awaiting their turn into the observer mode, and records the information in the management table 250.

In the terminal devices of the respective teacher and students, the CCD camera is located in front of the display unit so as to achieve eye contact in the one-to-one two-way interlocution between the teacher and student. FIGS. 10A and 10B are illustrations for explaining an example of information media delivered to the terminal devices of the respective users sorted in the interlocutor mode, as a data delivery method applied to the learning of conversation in a foreign language among many people (the data delivery method according to the present invention). In such distance learning of foreign language conversation, between the teacher and students, the audio media are delivered in a two-way mode among all the terminal devices.

Namely, in the terminal device of the teacher B, as shown in FIG. 10A, a video 800f of the student A under one-to-one two-way interlocution is displayed in an overlapping state with the CCD camera 5 on the monitor screen 8, and in the terminal device of the student A, as shown in FIG. 10B, a video 800g of the teacher is displayed in an overlapping state with the CCD camera 5 on the monitor screen 8, whereby the eye-contact state is established between the student A and the teacher B. Each terminal equipment of the students and teacher has the structure similar to that of FIG. 6. As shown in FIGS. 10A and 10B, each terminal device is provided with speakers 910a, 910b for outputting the voices of the teacher and student, and button characters 850 for giving instructions of comment entry, switching of interlocutor, and disclosure/nondisclosure of delivered information during interlocution are displayed on the monitor screen 8 of each terminal device. The terminal users sorted in the interlocutor mode may be the teacher and a plurality of students, or videos of plural people may be displayed on the monitor screen 8 according to selection of each student. On the monitor screen 8 presented to the teacher B (in the interlocutor mode) (cf. FIG. 10A), the video window 800f of the student A (in the interlocutor mode) under interlocution in the eye-contact state with the teacher B is displayed, and windows 820 displaying the teacher B himself and the other students n1, n2, ni (in the observer mode) are also displayed. Volume monitors 821 are simultaneously displayed in these windows 800f, 820, and they are effective, particularly, in the learning of foreign language. The reason is that a speaking person can be identified on the volume monitors. The information displayed on the windows 820 can be a still image of each student or a name of each student. Particularly, in the case where there are many students, it is preferable that names of all the students be displayed on the windows 820 and information about attendance of the students be presented on the monitor screen 8, in terms of permitting the teacher B to capture the participation situation of all the students.

On the other hand, on the monitor screen 8 presented to the student A (in the interlocutor mode) under interlocution with the teacher B (in the interlocutor mode), the video window 800g of the teacher B in the eye-contact state is displayed, and the videos, still images, or names of the student A himself and the other students (in the observer mode) are displayed in the windows 820. Volume monitors are also displayed in order to indicate the voice levels of the teacher B and students A, n1, n2, ni in the windows 800g, 820 displayed on the monitor screen 8 presented to the student A. Preferably, the mode is displayed so as to permit the student A himself to recognize that he is in the interlocutor mode, in the window displaying each video of the teacher and student A on the monitor screen 8 presented to the student A under one-to-one distance interlocution with the teacher (in FIG. 10B, the outer frames are enhanced for the window 800g displaying the video of the teacher B and for the video window 820 of the student A).

Figure 11:
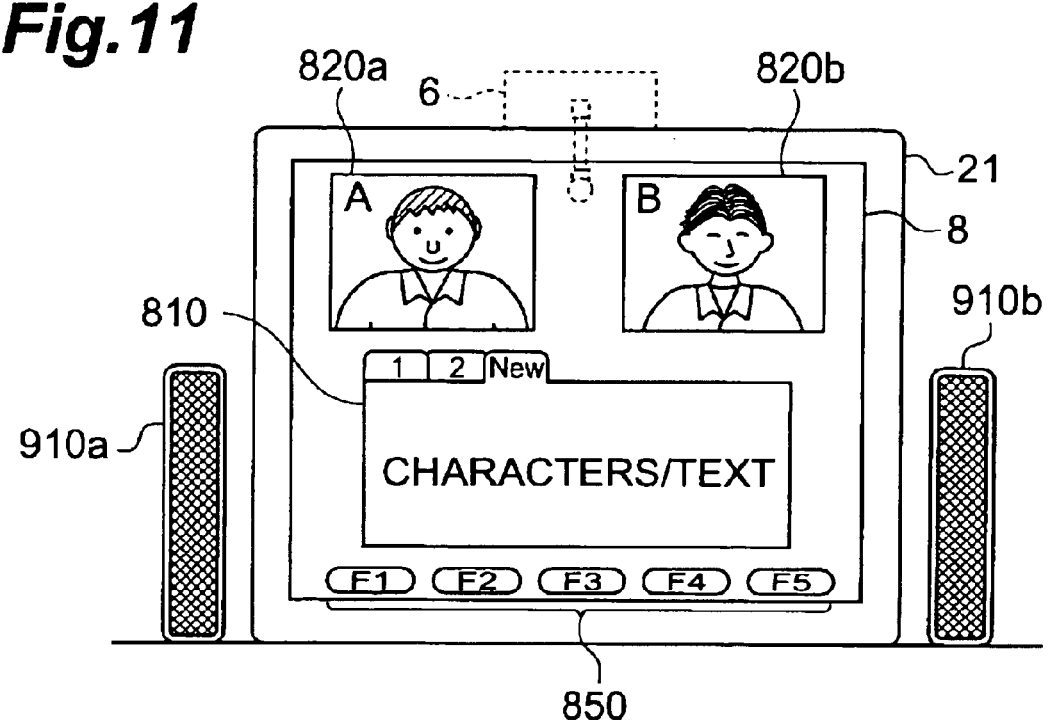
FIG. 11 is an illustration for explaining an example (No. 1) of information media delivered to the terminal device of each user sorted in the observer mode, as a data delivery method carried out in the videoconference system according to the present invention (the data delivery method according to the present invention), which is applied to learning of conversation in a foreign language among multiple people.
Figure 12:
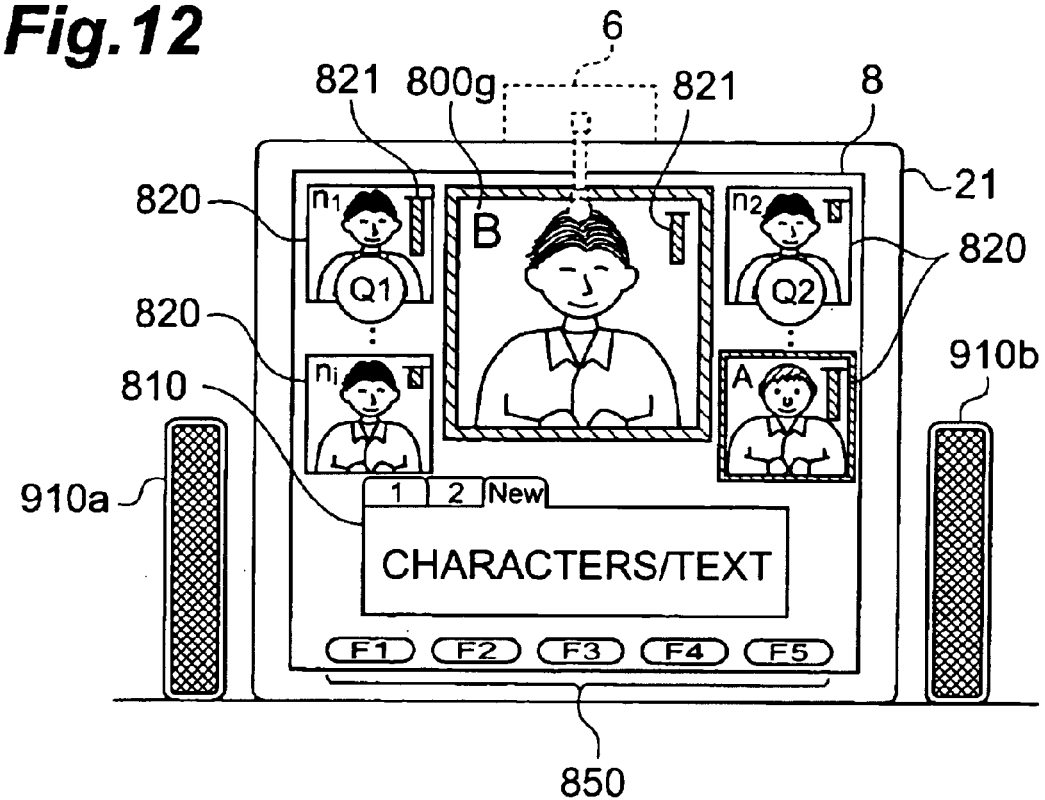
FIG. 12 is an illustration for explaining an example (No. 2) of information media delivered to the terminal device of each user sorted in the observer mode, as a data delivery method carried out in the videoconference system according

On the monitor screen 8 in the terminal devices of the other students n1, n2, ni sorted in the observer mode, as shown in FIG. 11, a video window 820a of the student A (in the interlocutor mode) and a video window 820b of the teacher B (in the interlocutor mode) both are displayed during the interlocution between the teacher B and the student A, and their voices are outputted from the speakers 910a, 910b. The different information media of video and audio are once edited in the server 200 and then delivered to the terminal devices of the respective students n1, n2, ni sorted in the observer mode. The information displayed on the monitors of the other students n1, n2, ni sorted in the observer mode can be, for example, only the video of the teacher B, or the video or still images of both the teacher B and student A, with output of their voices, depending upon selection by the teacher B or selection by each student n1, n2, ni. A window 810 for entry of a comment may also be displayed together with the videos of the teacher and student A under interlocution on the monitor screen 8. The information displayed on the monitors of the other students n1, n2, ni in the observer mode, may include display of a question mark to notify each user that a user in the observer mode has a question, as shown in FIG. 12. In this case, the display of the question mark presents the effect of facilitating the response or switching of interlocution. In FIG. 12, the display windows of the users other than the teacher B may be still images, or display of only the names of the respective users. As long as at least the display window of the user A is in active display, the other users can readily identify who is now speaking with the teacher.

When the teacher B and student A are through the interlocution, the teacher B reads the comment information transmitted and sends a reply of an answer comment to necessary comment information. At this time, the comment information transmitted and received can be transmitted and received either anonymously or onymously. In the anonymous case, disclosure of the comment to each student in the observer mode is effective in progress of interlocution. When one of the other students n1, n2, ni in the observer mode desires to cut in the conversation or when the teacher B desires to start conversation with one of those students n1, n2, ni, the server 200 replaces the participation mode of the student ni requesting the interruption or designated by the teacher B, with that of the student A in the interlocutor mode, thereby switching the student sorted in the interlocutor mode to another. For letting the teacher B designate the student ni for the next interlocution, the system may be arranged so that the teacher clicks the window 820 displaying the student ni or the name of the student ni whereupon the server 200 automatically updates the contents of the management table 250. Since the two-way mode is maintained at least as to the audio media among the terminal devices, any student in the observer mode can participate in the two-way interlocution between the teacher B and the student A by only voice, without switching of the participation mode.

In the videoconference as described above, the delay of information delivery between interlocutors is preferably controlled at or below 0.3 second during one-to-one two-way interlocution between the teacher B and the student A sorted in the interlocutor mode, but the delivery delay of approximately one to five seconds occurs in the delivery of information to the participants sorted in the observer mode, because the information is once edited on the server 200 side. However, the delivery delay of this level leads to no fatal system failure, because the delivery is not one to the participants of the teacher B and student A sorted in the interlocutor mode under interlocution. Some trouble can occur at the timing of inviting questions or at the timing of switching between the participation modes, but the delay is considered to be within tolerance in practical use. Particularly, the delivery service of comment information transmitted during distance interlocution between specific interlocutors (with the function of responding to the comment information transmitted) is significantly effective in overcoming the delivery delay and in efficiently advancing the videoconference itself.

Since the videoconference system applied to the learning of foreign language as described above enables the interlocution with partners of about a hundred to a thousand participants, questions can be limited to two per person or the setting time for questions can be limited to three minutes per person, whereby questions and dialogues by some limited persons can be preliminarily controlled on a software basis. The comment information transmitted may be transmitted by the voice mail function and in this case, there is no need for a corresponding input work such as input with a keyboard or input with a pen. Preferably, the transmitter can modify or delete the comment information once transmitted. Furthermore, it is preferable that a reply be sent along with a receipt number to each comment information transmitted, because anonymousness (in the case where each participant is named with a receipt number) is enhanced in the interaction. The videoconference system can also be applied to distance interpretation. When Japanese was supervised by an overseas supervisor, interlingual trouble occurred inevitably before. However, the videoconference system with an observer as an interpreter can link the interlocutors through smooth communication. In this case, the face of the interpreter does not always have to be displayed, and transmission of only voice data is sufficient. In the case of distance interpretation with a plurality of interpreters, it is also preferable to implement voice communication between specific observers or communication including image data of faces and others in relay interpretation from German to English and further from English to Japanese. Furthermore, the videoconference system can also be applied to training of interpreters.

According to the present invention, as described above, the participation modes of the participants are managed by the management table, and the data with different communication loads is delivered to the terminal device of each user in the interlocutor mode and to the terminal device of each user in the observer mode; therefore, the preset invention provides the effect of enabling smooth progress of interlocution in the form of respecting the information disclosure range of each participant while making use of the maximum performance of the current communication infrastructure, even in the distance interlocution among many people. Particularly, the system is widely applicable to the distance group counseling, the distance group supervision, the distance group learning, distance interpretation, and so on.

What is claimed is:

1. A videoconference system configured to implement transmission and reception of data by several types of media through a plurality of terminal devices connected by predetermined transmission means, said videoconference system comprising:

a management table for managing users of the respective terminal devices in a state in which the users are sorted in an interlocutor mode for interlocutors mainly engaged in progress of a specific subject and in an observer mode for observers except for the interlocutors; and communication control means for delivering information necessary for two-way interlocution in real time to the terminal devices of the respective users sorted in the interlocutor mode and for separately editing as delivered information, information by media selected from information associated with the interlocution between the interlocutors sorted in the interlocutor mode, and delivering the edited information to the terminal devices of the respective users sorted in the observer mode.

2. A videoconference system according to claim 1, wherein, in accordance with a mode switch instruction or request from a user sorted in the interlocutor mode or in the observer mode, said communication control means rearranges mode information managed by said management table so as to re-sort one of the users sorted in the interlocutor mode, into the observer mode and re-sort a user sorted in the observer mode, into the interlocutor mode.

3. A videoconference system according to claim 1, wherein said communication control means makes up the edited information to be delivered to the terminals of the users sorted in the observer mode, from interlocution-associated information by media selected by each user sorted in the interlocutor mode or in the observer mode.

4. A videoconference system according to claim 1, wherein said communication control means receives comment information including at least one of a signal, characters, a voice, and an image sent from a terminal device of a user in the observer mode and delivers the comment information to a terminal device of a user as a receiver among the users sorted in the interlocutor mode and in the observer mode.

5. A videoconference system according to claim 4, wherein, in accordance with an instruction of disclosure of the comment information from the user sorted in the observer mode, which is given by a user in the interlocutor mode, said communication control means delivers the comment information to the terminal devices of the other users sorted in the observer mode.

6. A videoconference system according to claim 4, wherein said communication control means delivers interlocution-associated information containing at least the number of transmissions of comment information and a remaining time of interlocution to the terminal device of each participant.

7. A videoconference system according to claim 1, wherein said communication control means delivers interlocution-associated information containing at least information specifying current interlocutors and information about attendance of observers to the terminal device of each user.

8. Terminal equipment applied to the videoconference system according to claim 1, said terminal equipment comprising:

a management table for managing all users of respective terminal devices, preliminarily registered as participants, in a state in which the users are sorted in an interlocutor mode for interlocutors mainly engaged in progress of a specific subject and in an observer mode for observers except for the interlocutors; and a control unit for delivering information necessary for two-way interlocution in real time to the terminal devices of the respective users sorted in the interlocutor mode and for separately editing as delivered information, information by media selected from information associated with the interlocution between the interlocutors sorted in the interlocutor mode, and delivering the edited information to the terminal devices of the respective users sorted in the observer mode.

9. Terminal equipment according to claim 8, further comprising:

a display unit for displaying at least a video of a partner user sorted in the interlocutor mode among the participants; and an image pickup unit for picking up an image of a user located in front of the display unit, said image pickup unit being located at a position where eye contact can be achieved between the user and the partner user through the video of the partner user displayed in the display unit.

10. A data delivery method in a communication system configured to implement transmission and reception of data by several types of media through a plurality of terminal devices connected by predetermined transmission means, said data delivery method comprising the following steps of:

managing users of the respective terminal devices in a state in which the users are sorted in an interlocutor mode for interlocutors mainly engaged in progress of a specific subject and in an observer mode for observers except for the interlocutors;

delivering information necessary for two-way interlocution in real time to the terminal devices of the respective users sorted in the interlocutor mode, and separately editing as delivered information, information by media selected from information associated with the interlocution between the interlocutors sorted in the interlocutor mode; and delivering the edited information to the terminal devices of the respective users sorted in the observer mode.

11. A recording medium in which a computer program for letting a computer execute a data delivery method according to claim 10 recorded.

12. A data delivery method according to claim 10, wherein, in accordance with a mode switch instruction or request from a user sorted in the interlocutor mode or in the observer mode, mode information managed by the management table is rearranged so as to re-sort one of the users sorted in the interlocutor mode, into the observer mode and re-son a user sorted in the observer mode, into the interlocutor mode.

13. A data delivery method according to claim 10, wherein, in accordance with a mode switch instruction or request from a user sorted in the interlocutor mode or in the observer mode, one of the users sorted in the interlocutor mode is re-sorted into the observer mode and the user designated by the mode switch instruction or request is re-sorted into the interlocutor mode.

14. A data delivery method according to claim 10, comprising the step of receiving comment information including at least one of a signal, characters, a voice, and an image sent from a terminal device of a user in the observer mode and delivering the comment information to a terminal device of a user as a receiver among the users sorted in the interlocutor mode and in the observer mode.

16. A data delivery method according to claim 14, comprising the step of, in accordance with an instruction of disclosure of the comment information from the user sorted in the observer mode, which is given by a user in the interlocutor mode, delivering the comment information to the terminal devices of the other users sorted in the observer mode.

16. A data delivery method according to claim 14, comprising the step of delivering interlocution-associated information containing at least the number of transmissions of comment information and a remaining time of interlocution to the terminal device of each participant.

17. A data delivery method according to claim 10, comprising the step of delivering information specifying current interlocutors and information about attendance of observers to the terminal device of each user.

18. A computer program stored in a computer readable medium for letting a computer execute a data delivery method according to claim 10.

* * * * *